Aug. 4, 1942.  F. C. BASELT  2,291,604
METHOD OF CANNING A LIQUID COFFEE BEVERAGE
Filed Oct. 21, 1939
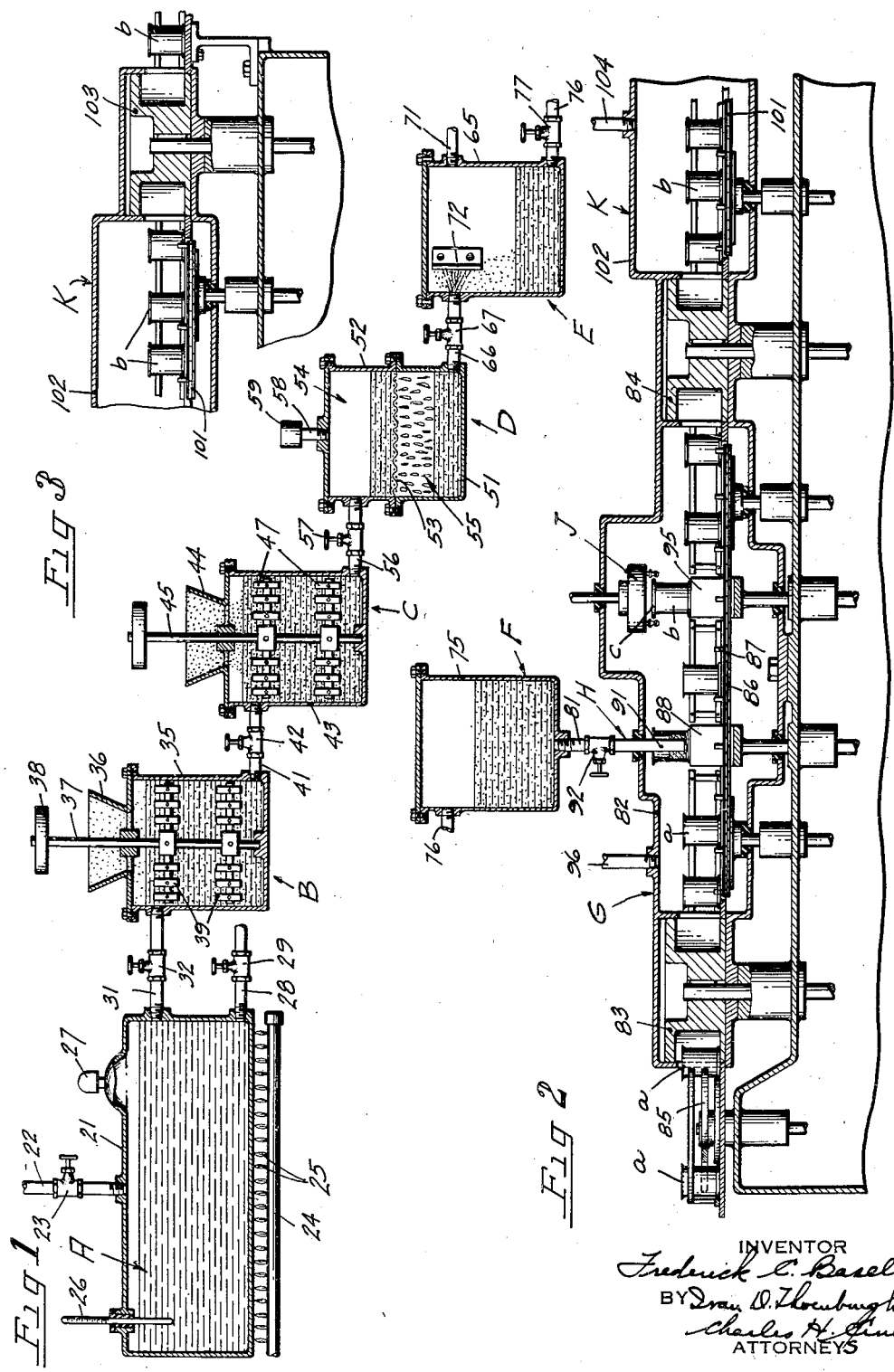
INVENTOR
Frederick C. Baselt
BY
ATTORNEYS Patented Aug. 4, 1942

2,291,604

UNITED STATES PATENT OFFICE 2,291,604

METHOD OF CANNING A LIQUID COFFEE BEVERAGE

Frederick C. Baselt, New York, N. Y., assignor to American Can Company, New York, N. Y., a corporation of New Jersey Application October 21, 1939, Serial No. 300,644

6 Claims. (Cl. 99—71)

The present invention relates to the canning of liquid coffee and has particular reference to an improved method of providing a fully prepared, ready to drink, liquid coffee having the full strength and desirable flavors of a coffee beverage freshly made and one which may be kept over a period of time without deterioration. This invention is an improvement upon the copending application of George A. Fisher, filed in the United States Patent Office July 19, 1937, as Serial Number 154,393.

Coffee as a beverage must have at least two important and desirable characteristics, flavor and stimulating effect. A certain proportion of the materials found in solution in a freshly made batch of coffee does not add to the flavor of the coffee or to its stimulating effect and may be eliminated without the beverage being adversely affected. In fact, it has been found that if the ready to drink coffee is to be kept for some time before being used, these superfluous materials must be removed.

Such materials are sugars and proteins in various stages of fortification, and might be retained if it were not for the fact that they furnish nutriment for bacterial growth. Obviously, where the freshly brewed coffee is consumed in a short time, this bacterial phase is unimportant but where the coffee brew is to be packed in containers for future consumption, this bacterial growth problem becomes very important.

Another important problem in the canning and keeping of coffee is staleness as the result of oxidation. Staleness of ground and roasted coffee by loss or deterioration of flavoring ingredients, commonly known as essential oils, is well known and very accurate measurements have been made of the time rate of the development of staleness of the ground product. It has been determined that this loss of essential oils is the result of destructive forces of oxygen in the air and where oxygen is permitted to contact roasted and ground coffee, staleness is sure to follow in a very short time.

The problem of loss of flavor by oxidation is also present, and perhaps to even a greater degree, in the use of liquid coffee, since both air and water constitute that element.

The present invention contemplates controlling canning conditions by a process which largely removes the majority of the destructive forces referred to above. It is directed to a method of preparing a liquid coffee drink hermetically sealed in a container and ready for use without alteration and which is immune to a bacterial destruction and oxygen deterioration. In other words, it is an invention having for its purpose the production of a full flavored, ready to drink beverage which may be kept over long periods of time.

In such a method the unimportant sugars and proteins referred to above as assisting in bacterial growth, are largely removed by sharp filtration and oxidation by air and water are effectively controlled.

Many waters are not satisfactory for making a liquid coffee which will satisfy the rigid requirements of the present invention and the present invention therefore contemplates also the proper balancing or control of alkalinity of the water used where it is necessary. This is done by treating the water with an alkaline buffering substance directed to the control of the pH in the final product. In addition the sealed product is pasteurized or substantially sterilized so that should any bacteria have been introduced into the coffee at any stage of the canning process it will not be effective even though the canned liquid coffee is retained in the can for long periods of time before being used.

An object of the present invention is the provision of a method of canning treatment for converting roasted ground coffee into an improved liquid coffee beverage which is confined within a hermetically sealed can in a manner which will provide a true, ready to drink coffee beverage and one which may be retained in storage without deterioration.

Another object of the invention is the provision of such a method which will provide uniformity of flavor, control of the pH of the final product being had primarily by uniformity of the alkalinity of the water used.

Still another object is the provision of a method which provides for retention of all of the desirable flavor and stimulating elements while eliminating undesirable substances which if retained would provide favorable conditions for bacterial growth, thus producing an improved liquid coffee beverage capable of keeping as a stable fresh commercial product until used.

Numerous other objects and advantages of the invention will be apparent as it is better understood from the following description, which, taken in connection with the accompanying drawing, discloses a preferred embodiment thereof.

Referring to the drawing, Figures 1, 2 and 3 when arranged end to end schematically illustrate all of the various steps of the method by diagrammatically showing parts of an exemplary apparatus connected in the form of a flow sheet by means of which not only each step in the procedure is indicated but the exemplary relation of the various steps one to the other is quickly discerned.

The first step in the present preferred example is the heating of the water and certain water impurities are eliminated at such a time. This is done in a suitable water heater indicated in Figure 1 by the letter A. The temperature used would be around 212° F.

The water available for canning in different locations varies as to its alkalinity and for best results many waters cannot be successfully used in the brewed liquid product of the present invention without special treatment. Unless the water happens to be of the required alkalinity, therefore, such water is first treated. This step is suggested by the letter B which broadly indicates an alkaline mixer where the purified and heated water as received from the heater A is mixed with the proper alkaline buffering substance to control the pH. In the final product the pH reading may be in the neighborhood of five, as one example.

The letter C suggests a suitable coffee mixer where the properly roasted and properly ground coffee is introduced into and thoroughly mixed with the treated hot water which is preferably at a temperature not below 170° F. This constitutes the brewing step.

A filtering step follows and the letter D denotes a filter for the brewed coffee. This is preferably a sharp filtering operation and is preferably assisted by vacuum, filter D being closely connected to a vacuum device E which includes the step of vacuumizing the filtrate as it comes from the filter D.

F is a filling tank into which the filtered and vacuumized liquid coffee flows. The liquid coffee is ready for filling into cans at this stage of the process.

The filling and closing of the can is preferably done in an enclosed chamber. In some cases this may constitute a vacuum chamber from which the air is exhausted and into which the empty cans are properly fed for filling. Or the empty cans may be filled in one machine and vacuum closed in another. While in this vacuum chamber, the filled cans will be hermetically sealed by the application of a can cover or top end. Such a chamber is indicated by the letter G, the empty can being introduced into the chamber and presented to a filling device H which connects with the tank F. The letter J represents a usual form of seaming head which is used for hermetically sealing the cover onto the filled can.

In some installations the chamber G may be a gas chamber instead of a vacuum chamber. When this condition obtains the cans are filled and/or sealed in an atmosphere of gas.

The sealed cans after being removed from the chamber G are preferably pasteurized or sterilized by heat and a suitable cooker K may be used for this purpose. A positive cooling device may be added to the apparatus or the filled and sealed cans may be cooled at ordinary room temperature.

The resulting sterilized sealed can of coffee beverage may then be stored or distributed in any suitable manner according to requirement and even when some period of time elapses between the final sterilizing step and the using of the coffee beverage, the beverage prepared and packed according to this method remains in its original fresh condition having full strength and desirable flavors.

Considering more in detail the drawing, the water heater A may comprise a boiler tank 21 into which water to be used for the process may be introduced through a water inlet pipe 22. A hand valve 23 controls the flow of water into the tank 21. The tank is heated in a suitable manner, the drawing illustrating a gas manifold pipe 24 having a plurality of burners 25 arranged below the tank. A thermometer 26 mounted in the top of the tank gives visual indication of the temperature of the water within the tank. Such temperature is maintained at substantially 212° F. for the desired time of heating. A relief valve 27 may also be connected in the top of the tank to permit escape of air or gases.

The water heater A, as has already been indicated, is used not only as a heater but functions to eliminate certain water impurities. For this purpose a drain pipe 28 may be used to draw off sediments and impurities. This pipe is threaded into one end of the tank 21 near its bottom and is provided with a hand control valve 29.

The purified water is removed from the tank from near its top and passes through an outlet pipe 31 which is threaded into the end of the tank. Pipe 31 leads directly to the alkaline mixer B. A hand valve 32 located in the pipe line provides for control of the passage of water into the mixer. The alkaline mixer B consists in part of a casing 35 and a hopper 36, the latter being mounted on top of the casing. This hopper communicates, by way of suitable openings in the top of the casing, with the interior of the mixer into which the purified water is allowed to flow from the pipe 31.

Means are provided for agitating or stirring the alkaline buffer substance which is introduced into the hot water by way of the hopper. This agitating device comprises a vertically disposed rotatable shaft 37 which carries a pulley 38 at its upper end by means of which rotation may be imparted to the shaft. The shaft extends down through the center of the hopper 36 and into the casing 35. It carries a plurality of baffle plates 39 the drawing illustrating two sets of such plates one adjacent the bottom of the casing and the other near the top.

The water which flows into the casing 35 may be measured so that a given quantity of the water is introduced into the casing and then a proper amount of the alkaline substance is poured into the hopper 36 from which it passes through the opening in the top of the casing and into the water below. This feeding of the alkaline substance is accompanied by rotation of the shaft 37 and the alkaline material is thus thoroughly mixed with the water in the mixer B.

Satisfactory alkaline buffering materials may include trisodium phosphate ($Na_3PO_4$), lithium carbonate ($LiCO_3$) or potassium citrate ($K_3C_6H_5O_7$). The quantity of buffering substance put into the water will depend entirely upon the original alkalinity of the water which, as before stated, varies in different localities and may be accurately determined. The pH of the final coffee beverage desired is the controlling factor and it is believed that best results are obtained when such pH is around five in the final product.

An outlet pipe 41 extends from the bottom of the casing 35 into the top of the coffee mixer or percolator C. A hand control valve 42 provides for the desired passage of the treated water from the casing 35 into the mixer C.

The coffee mixer C may be similar in construction to the alkaline mixer B. It comprises a casing 43 having a hopper section 44 and a vertically disposed shaft 45. A pulley carried on the upper end of the shaft provides for rotation of the shaft. Baffle plates 47 are carried by the shaft on the inside of the casing 43 and effect mixing of the treated water, which flows into the casing from the alkaline mixer B, and of the roasted and ground coffee which is introduced in to the mixer chamber through the hopper 44.

For best results, a dark roasted coffee of low acidity is suggested. The taste of the final product also depends upon the particular blend of the coffee. The coffee which is introduced into the mixer C by way of the hopper 44 for best results should have what is known as a medium grind.

This matter of coffee blending, roasting and grinding is briefly mentioned at this point to suggest that the taste of the final canned liquid beverage may be incidentally affected by certain blending, roasting and grinding controls which the present applicant does not claim as his invention.

At the time that the coffee is mixed with the treated water in the casing 43 of the coffee mixer C, the water is still hot. Its temperature should be at least 170° F. If further heat is required for this step, provision can be made for introducing more heat into the chamber of the mixer at this point. After proper mixing for a period of time which will vary according to the desired strength of the brew, the liquid coffee which then substantially fills the coffee mixer, may be considered as being fully brewed and as such is ready to be filtered.

The filter D comprises a bottom tank 51 having a top section 52 which is bolted to the bottom section thus providing a split, two-piece casing. A filter cloth or filter screen 53 is horizontally disposed between the tank sections, being removably secured in place between the top and bottom members 51, 52. This filter divides the unit into an upper chamber 54 and a lower chamber 55.

The brewed coffee is drawn off from the coffee mixer C by means of a pipe 56 which leads into the top section 52 of the filter D. A hand valve 57 disposed in the pipe line permits manual control of the passage of the coffee from the coffee mixer C into the filter D. This construction of filter permits removal and replacement of the filter screen 53 when it is necessary and this is done by separating the tank sections 51, 52 and replacing the filter screen.

The liquid coffee in the upper chamber 54 is unfiltered and during the filtering action, passes down through the filter screen 53 into the lower chamber 55. The liquid in the chamber 55 is thus the filtrate. This filtering action is preferably sharp filtering and is accelerated by a vacuumizing action. For this purpose the chamber 55 may be connected to the vacuumizing device E. Since there is some air in the liquid filtrate the vacuumizing of the outlet connection passing from the chamber 55 will usually give the required sharp filtering. However, the filtering action may be accelerated by admitting some air or gas into the upper chamber 54 above the liquid. Where this is done it is desirable that such air or gas be sterile.

A vent pipe 58 is disposed in the top of the tank 52 for this purpose and atmospheric pressure may thus be introduced into the upper filter chamber. The pipe 58 is preferably capped with an enlarged cup-shaped member 59. If air is used this cup is for the purpose of holding an intercepting wad of sterilized cotton through which the air must pass upon entering into the filter D.

The vacuum device E comprises a tank 65 which is connected with the filter D by a pipe 66. A hand valve 67 located in this pipe allows for proper manual control of the passage of the filtered coffee from the chamber 55 into the tank 65. A vacuum pipe 71 is threaded into the tank 65 near the top and a baffle plate or shield 72 located in the tank directly opposite the end of the pipe 66 insures that the filtered coffee as it is drawn into the tank 65 will not pass into the vacuum pipe 71. This arrangement allows for the filtered coffee to fall to the bottom of the tank 65 during which time any remaining air is removed and the filtrate is thus properly vacuumized.

At this stage of the operation, the liquid coffee has undergone all of the treatment necessary to provide the desired beverage. The undesirable sugars, proteins and undissolved parts have been removed. Oxygen air has been removed. The stimulating elements are retained as are also the flavoring elements. It may thus be stored in the filling tank F, which comprises a housing 75 the upper part of which is connected to the lower part of the device E by a pipe 76. A hand valve 77 arranged in this pipe gives the desired manual control for opening or closing the connection between the parts E and F.

When it is desired to fill the coffee beverage into cans, the coffee is withdrawn from the bottom of the filling tank F by means of a pipe 81 which leads into the chamber G. This chamber is located within a housing 82 which encloses both the filling and the seaming parts of the apparatus. This housing is provided with an opening at each of two opposite ends to accommodate an entrance valve 83 at one end and an exit valve 84 at the other. The valves are suitably rotated to introduce empty cans $a$ into the chamber G and to discharge filled and sealed cans $b$ from the chamber. For this purpose, the valves 83, 84 are rotatably fitted in valve seats surrounding the openings in the ends of the housing 82 so that the chamber G is substantially closed. The chamber may be maintained either under vacuum, if vacuum is used in the device, or under gas if the filling and seaming are done under a gas medium.

A starwheel 85 may be used for feeding the empty cans $a$ into the pockets of the entrance valve 83. Such a valve may be provided with suitable feed fingers for discharging the can from its valve pocket after the can has been introduced into the chamber G. The drawing illustrates a chain conveyor 86 having a plurality of fingers 87, which conveyor receives the can as it is discharged from the pocket of the entrance valve 83 and brings the can over a lifter 88 associated with the filling device H. Lifter 88 is mounted in the housing 82 and has vertical movement. When the lifter 88 is raised from under the can, the latter is lifted from its position in front of one of the can feed end fingers 87 of the conveyor and is brought into filling position above the conveyor.

The pipe 81 extends down through the top of the housing 82 and into a discharge filling head 91 which is part of the filling device H. A hand valve 92 disposed in the pipe line 81 provides for closing off connection between the tank F and the filling head 91 when no filling is taking place.

After filling, the can is returned to the conveyor by descent of the lifter 88. The conveyor then moves it into position over a second lifter 95 located at a seaming station. Lifter 95 is in alignment with and is below the seaming head J. During this time of filling the can and moving it to the seaming station it is subjected to the atmosphere contained within the chamber G. If the chamber is used as a vacuum chamber air is withdrawn from the can and from the liquid coffee being filled into the can as by means of a vacuum pipe 96. Where chamber G is a gas chamber it is filled with an inert gas such as carbon dioxide, and such gas fills the empty can. The gas in the empty can is displaced by the liquid coffee as the latter is filled into the can. Any head space in the can, as it moves to filling position, is therefore filled with gas under these conditions.

Ascent of the lifter device 95 removes the filled can from the conveyor and subjects its open upper end to the seaming head J. In so doing a can end c is first located on the can. This is the usual seaming machine procedure, it being understood that the can ends are fed into the chamber G in suitable manner and are properly positioned relative to both can and seaming head. This seaming head J may be rotated in any suitable manner and may be of the usual construction wherein the can end c after being positioned onto the filled can, is double seamed or otherwise joined to the can thereby sealing the can.

After the seaming operation the can is again returned to the conveyor and is thereupon introduced into a pocket of the discharge valve 84. This valve removes the can from the chamber G and preferably places it upon another conveyor 101 which is adapted to pass through the pasteurizer or sterilizing cooker K. The cooker K comprises a housing 102 which has openings at its ends to provide valve seats. The exit valve 84 for the chamber G may constitute an entrance valve for the cooker and is so shown in Fig. 2 in the valve seat to the left of the chamber.

At the opposite end of the cooker housing 102 is an exit valve 103 (Fig. 3) which receives the sterilized cans after their passage through the cooker by way of the conveyor 101 and discharges the cans to any suitable place of deposit.

Provision may be made for proper heating to effect the pasteurization or sterilization of the can contents. The heat necessary for sterilization will be substantially 212° F. Such required heat for the cooker may be a steam heat introduced into the cooker by way of a pipe 104 threaded into the top of the housing 102. The resulting heat which is effective on the can for sterilizing the contents is thus applied as the cans pass through the chamber of the cooker K. A cooling device for cooling the containers may be added if desired.

This completes the various steps of the process. The resulting sealed coffee beverage, enclosed in the can without the presence of oxygen and in substantially a sterile condition may now be kept over a period of time without deterioration. When the coffee beverage is to be used, it is merely necessary to open the can and discharge the liquid which is in proper form without further addition of water or other materials. If the coffee beverage is to be served hot it is merely necessary to heat it. If it is to make a cold drink, such as iced coffee, it can be used without any further preperation or it may be placed in a refrigerator.

It is understood that the apparatus described is merely a preferred example to illustrate the various steps of the method. The sequence of the various devices and steps may of course be changed to suit convenience or requirements and some of the steps may even be omitted without departing from the essentials of the invention.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. The method of preparing and packing a liquid coffee beverage capable of indefinite preservation while retaining its original desirable characteristics, which method comprises, boiling a quantity of water to eliminate air and impurities, thoroughly mixing a ground roasted coffee with the heated air-freed water while the latter is hot, sharply filtering the mixture to eliminate undesired bacteria promoting constituents thereof, vacuumizing the filtrate to remove oxygen therefrom, filling the air-freed filtrate into a container, closing and hermetically sealing the container in the absence of air, and finally heating the sealed container to sterilize the liquid coffee beverage therein.

2. The method of preparing and packing a liquid coffee beverage capable of indefinite preservation while retaining its original desirable characteristics, which method comprises, boiling a quantity of water to eliminate air and impurities, thoroughly mixing a ground roasted coffee with the heated air-freed water while the latter is hot, sharply filtering the mixture with the aid of vacuum to eliminate undesired bacteria promoting constituents thereof and to remove air from the filtrate, filling the air-freed filtrate into a container in the absence of air, closing and hermetically sealing the container under air free conditions, and finally heating the sealed container to sterilize the liquid coffee beverage therein.

3. The method of preparing and packing a liquid coffee beverage capable of indefinite preservation while retaining its original desirable characteristics, which method comprises, boiling a quantity of water to eliminate air and impurities, treating the air-freed water with an alkaline buffer salt to provide a desired alkalinity, thoroughly mixing a ground roasted coffee with the heated air-freed water while the latter is hot, sharply filtering the mixture to eliminate undesired bacteria promoting constituents thereof, vacuumizing the filtrate to remove oxygen therefrom, filling the air-freed filtrate into containers, closing and hermetically sealing the containers in the absence of air, and finally heating the sealed containers to sterilize the liquid coffee beverage therein.

4. The method of preparing and packing a liquid coffee beverage capable of indefinite preservation while retaining its original desirable characteristics, which method comprises, boiling a quantity of water to eliminate air and impurities, adding a ground roasted coffee to the air-freed water, thoroughly incorporating the coffee in a uniform mixture, sharply filtering the mixture to eliminate undesired bacteria promoting constituents thereof including undissolved sugars and proteins, vacuumizing the filtrate to remove oxygen therefrom and to induce sharp filtration, filling the air-freed filtrate into containers in an atmosphere of inert gas, hermetically sealing the filled containers in an atmosphere of inert gas to enclose the liquid coffee beverage in the absence of oxygen, and finally heating the sealed container to sterilize the liquid coffee beverage therein.

5. The method of preparing and packing a liquid coffee beverage capable of indefinite preservation while retaining its original desirable characteristics, which method comprises, boiling a quantity of water to substantially its boiling point to eliminate the air and separate impurities therefrom, treating said water with an alkaline substance to provide a desired alkalinity, adding a ground roasted coffee to the treated water while its temperature is above 170° F. and thoroughly mixing the same by stirring, sharply filtering the mixture to eliminate undesired bacteria promoting constituents thereof including undissolved sugars and proteins, vacuumizing the filtrate, filling into containers under substantially air free conditions, closing and hermetically sealing the containers in the absence of air, and finally heating the sealed containers to a temperature of about 212° F. to sterilize its contents.

6. The method of preparing and packing a liquid coffee beverage capable of indefinite preservation while retaining its original desirable characteristics, which method comprises, boiling a quantity of water to eliminate air and impurities, treating said water with an alkaline buffering substance to control the pH to a point where the final product will have a pH value of substantially 5.0, adding a ground roast coffee to the hot air-freed and treated water, thoroughly incorporating the coffee in a uniform mixture by stirring, sharply filtering the mixture to eliminate undissolved undesired bacteria promoting constituents thereof including undissolved sugars and proteins, vacuumizing the filtrate to remove oxygen therefrom and to induce said sharp filtration essential to such elimination, filling the air-freed filtrate into containers, closing and hermetically sealing the containers under air-free conditions, and finally heating the sealed cans to sterilize the beverage therein.

FREDERICK C. BASELT.